United States Patent [19]

Kidouchi et al.

[11] Patent Number: 4,711,392
[45] Date of Patent: Dec. 8, 1987

[54] MIXING VALVE APPARATUS

[75] Inventors: Yasuo Kidouchi, Yamatokouriyama; Hiroaki Yonekubo, Kyoto, both of Japan

[73] Assignee: Matsushita Electric Industrial Co., Ltd., Kadoma, Japan

[21] Appl. No.: 807,525

[22] Filed: Dec. 10, 1985

[30] Foreign Application Priority Data

Dec. 11, 1984 [JP] Japan ............................ 59-261159
May 31, 1985 [JP] Japan ............................ 60-118339
Jun. 25, 1985 [JP] Japan ............................ 60-139326

[51] Int. Cl.$^4$ .................... G05D 23/13; F16K 29/00
[52] U.S. Cl. .................................. 236/12.12; 137/332; 137/625.33
[58] Field of Search ............... 236/12.12; 137/332, 137/625.33

[56] References Cited

U.S. PATENT DOCUMENTS

| 999,809 | 8/1911 | Lindemuth | 137/332 X |
| 1,819,045 | 8/1931 | Snediker | 236/12.11 |
| 2,591,274 | 4/1952 | Mahoney, Jr. | 137/625.33 |
| 2,780,412 | 2/1957 | Holley | 236/12.15 |
| 3,322,342 | 5/1967 | Veale | 236/12.12 |
| 3,730,224 | 5/1973 | Prisk | 137/625.33 |
| 4,243,063 | 1/1981 | Parkison | 137/100 |
| 4,420,811 | 12/1983 | Tarnay et al. | 364/502 X |

Primary Examiner—William E. Wayner
Attorney, Agent, or Firm—Cushman, Darby & Cushman

[57] ABSTRACT

A mixing valve apparatus provides a pressure balancing valve which has fins on their valve members and is forced to rotate by hot- and cold-water flows, two valve means for controlling flows of hot and cold water, a temperature sensor and a flow rate sensor. The valve means are shifted by respective electric driving means which are driven by a controller based on detected data of the temperature sensor and the flow rate sensor.

7 Claims, 9 Drawing Figures

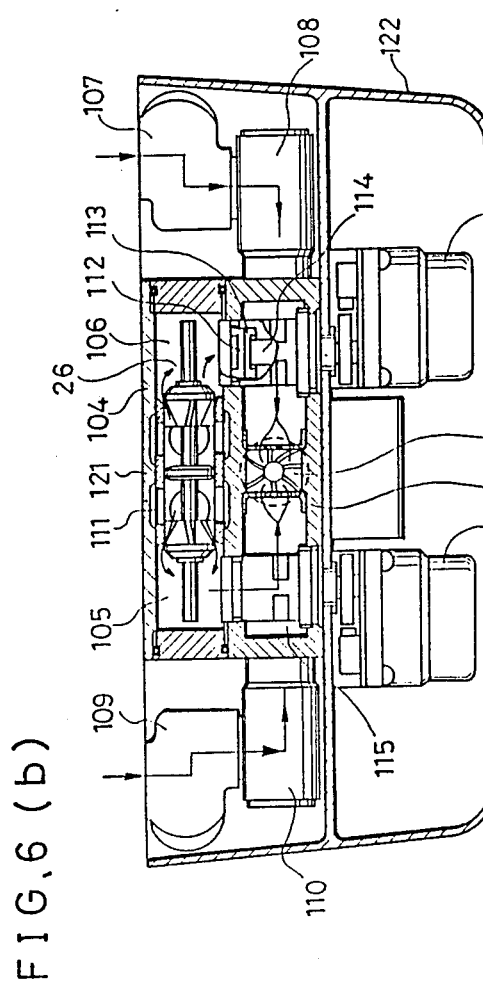
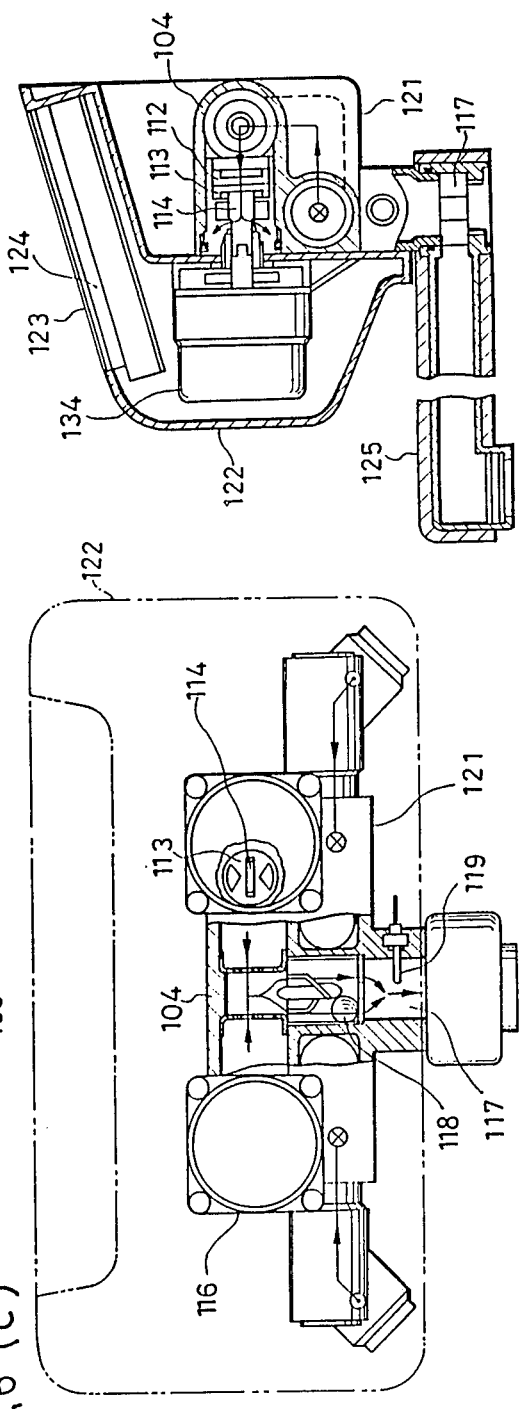
FIG. 6 (a)
FIG. 6 (b)
FIG. 6 (c)

MIXING VALVE APPARATUS

FIELD OF THE INVENTION AND RELATED ART STATEMENT

1. Field of the Invention

The present invention relates to a valve apparatus for mixing hot and cold water, and more particularly one having a control means to control a water temperature by using electrical controlling means.

2. Description of the Related Art

There is a need for mixing hot and cold water to produce discharge stream that has a desired stable temperature which is intermediate between two extremes. A mixing valve for such a utility is controlled by hand and the temperature of the discharge system is adjusted by change of a mixing ratio between the hot and cold water. In such a mixing valve, transient changes of discharge water temperatures that are caused by changes in either hot- or cold-water pressures are controlled by a pressure balancing valve.

An example of the above-mentioned mixing valves is shown in the U.S. Pat. No. 4,243,063 (The corresponding Japanese published unexamined Patent Application is No. Sho 56-49471). The schematic diagram of the mixing valve in accordance with the U.S. Pat. No. 4,243,063 is shown in FIG. 1. A manifold 200 has a threaded hot-water inlet fitting 1 and a threaded cold-water inlet fitting 3. The hot-water inlet fitting 1 is in fluid communication with a valve housing 201 for a hot-water check stop 2. The passageway for the hot-water in conduit 202 is routed through two right angle turns to the inlet (not shown in FIG. 1) of a pressure balancing valve housing 203.

The cold-water inlet fitting 3 also establishes fluid communication with another inlet (not shown in FIG. 1) in the pressure balancing valve housing 203 by way of a cold-water check stop valve 4.

Hot- and cold-water check stop valves 2 and 4, respectively, are shown in full section in the manifold 200. The structure of each of these two valves 2 and 4 is essentially the same. Hot-water and cold-water flowing through the inlet fittings 1 or 3 are selectively interrupted by means of the check stop valve 2 or 4 which open and close in response to the action of the flow or the lack of flow of hot and cold water. Thus, hot water in the conduit 202 flows into the pressure balancing valve housing 203 by way of a hot-water inlet 14. In a similar manner, cold water in conduit 204 flows into the pressure balancing valve housing 203 through an inlet 15. Within the balancing valve housing there is a generally cylindrical chamber 5 that houses a pressure balancing spool 6. The length of the spool 6 is less than the corresponding length of the chamber 5. The spool 6, moreover, has two annular grooves 205, 206 which form annular lands 7, 9 at the extreme ends of the spool. A central disposed annular land 8, moreover, separates the two grooves 205, 206. Although, for illustrative purposes, the schematic presentation of the spool 6 and the chamber 5 in FIG. 1 shows a gap between the outside diameters of the lands 7, 8 and 9 and the inside diameter of the chamber 5, the fit between these lands and the inner surface of the chamber nevertheless is snug, but with sufficient clearance to permit the spool 6 to move laterally. Further in this respect, the groove 205 is slightly offset toward the central land 8 with respect to the hot-water inlet 14 of the housing 203, when the spool is centered within the chamber 5. In a similar manner, the groove 206 also is offset toward the land 8 relative to the cold-water inlet 15 when the spool 6 is centered in the housing 203. Note should be made, in this regard, of the fact that the grooves 205, 206 are appreciably wider than the respective hot- and cold-water inlets 14, 15. The bore 207 in spool 6 intersects a longitudinally disposed bore 11 which provides a conduit for water flow between the bore 207 and a cavity 10 that is formed between the land 7 and the adjacent transverse end of the housing 6. A similar combination of diametrically oriented bore 208 and intercepting conduit 13 provides fluid communication between the cold-water outlet 208 and a cavity 12 that is formed by means of the land 9 and the adjacent end of the chamber 5.

The spool 6 is moved laterally by unbalanced pressures of hot and cold water, and the pressures of hot and cold water in the respective outlets 209, 211 are equalized. The hot and cold water in the outlets 209 and 211, respectively flow to a mixing valve cartridge 16, and are mixed to a suitable mixing ratio of hot and cold water by manual adjustment of a valve handle 19. Hot and cold water join in a mixed water discharge conduit 20 and are controlled its flows by a mixed water volume control 21. The mixed water is supplied, for example, to a water shower.

In the mixing valve in accordance with the U.S. Patent, the following defects are pointed out.

(1) Since the spool has a weight and there is a friction between outside surfaces of the land 7, 8, 9 and an inside wall of the chamber 5, the spool cannot move smoothly and cannot move to a precise designed position corresponding to a difference of the pressures of hot and cold water. As a result, the pressures of hot and cold water in the respective hot- and cold-water outlets 209 and 211 cannot perfectly be equalized.

(2) The mixing valve in this U.S. Patent has no means which detect the temperature of the mixed water and compensate the temperature in accordance with the detected data. Therefore, for example, in case that an oil boiler is used wherein the temperature of discharging water is controlled by firing or extinction of a burner is used, the temperature of hot water from the oil boiler changes cyclically. As a result, the temperature of mixed water fluctuates.

(3) Automatic temperature control of mixed water is impossible in this mixing valve.

(4) Compounds of calcium or magnesium in water adhere to inner walls of the bores in an operation for a long period, and the function of the pressure balancing valve becomes unstable due to additionnal friction caused by the adhered compounds.

OBJECT AND SUMMARY OF THE INVENTION

An object of the present invention is to provide a mixing valve wherein a mixing ratio of hot and cold water is controlled by an electrical driving means, so that and a transient fluctuation of temperature of mixed water is improved.

Mixing valve apparatus in accordance with the present invention comprises:

a pressure balancing valve for equalizing pressures of hot and cold water from hot- and cold-water lines, first valve means for controlling flow of hot water from the pressure balancing valve, second valve means for controlling flow of cold water from the pressure balancing valve, first electric driving means for moving the first valve means, second electric driving means for moving the second valve means, a mixing conduit for mixing hot and cold water from the first valve means and the second valve means, a temperature sensor for detecting temperature of mixed water, setting means for setting desired temperature of mixed water, and control means for controlling the first electric driving means and the second electric driving means in accordance with detected data by the temperature sensor and set data by the setting means, further comprises:

a setting for desired flow of mixed water and total volume of hot- and cold-discharge water mixture, a flow sensor for detecting flow of mixed water.

BRIEF DESCRIPTION OF THE DRAWINGS

FIG. 6(a) is a cross-sectional side view of a third embodiment of the mixing valve apparatus in accordance with the present invention.

FIG. 6(b) is a cross-sectional plane view of the third embodiment.

FIG. 6(c) is a cross-sectional front view of the third embodiment.

DESCRIPTION OF THE PREFERRED EMBODIMENT

Figure 1:
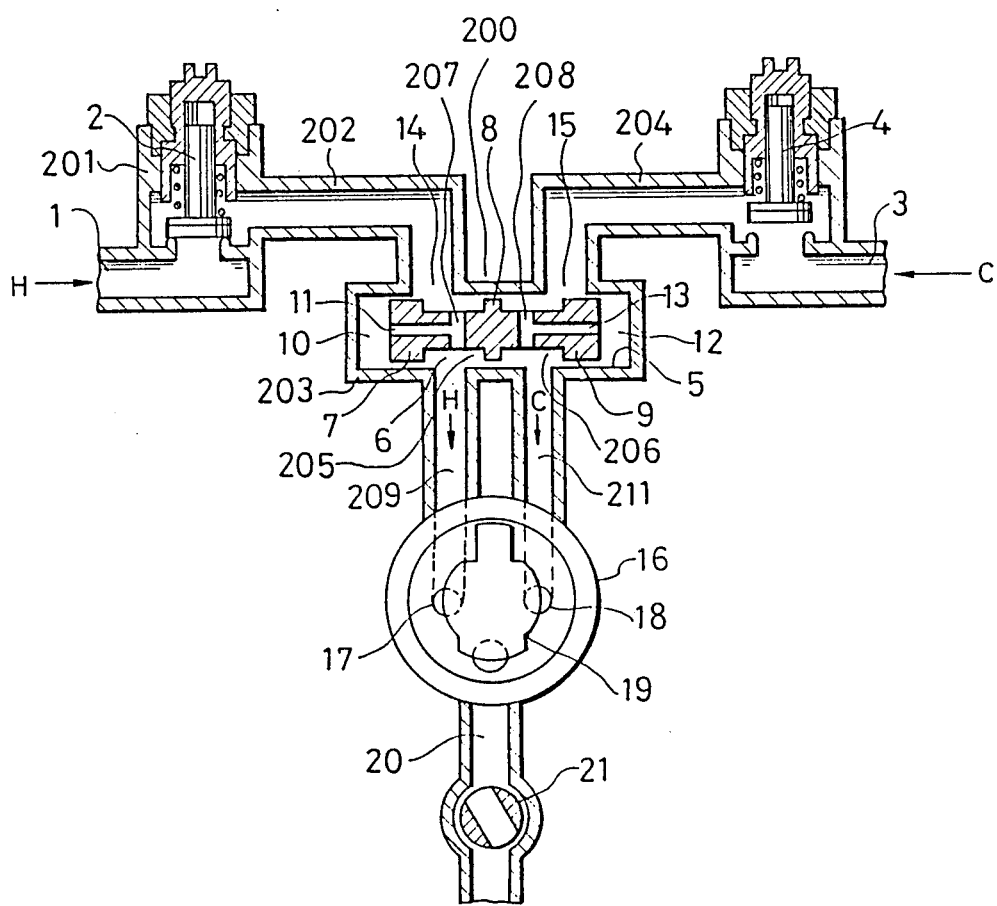
FIG. 1 is a schematic diagram of the mixing valve in the prior art.
Figure 2:
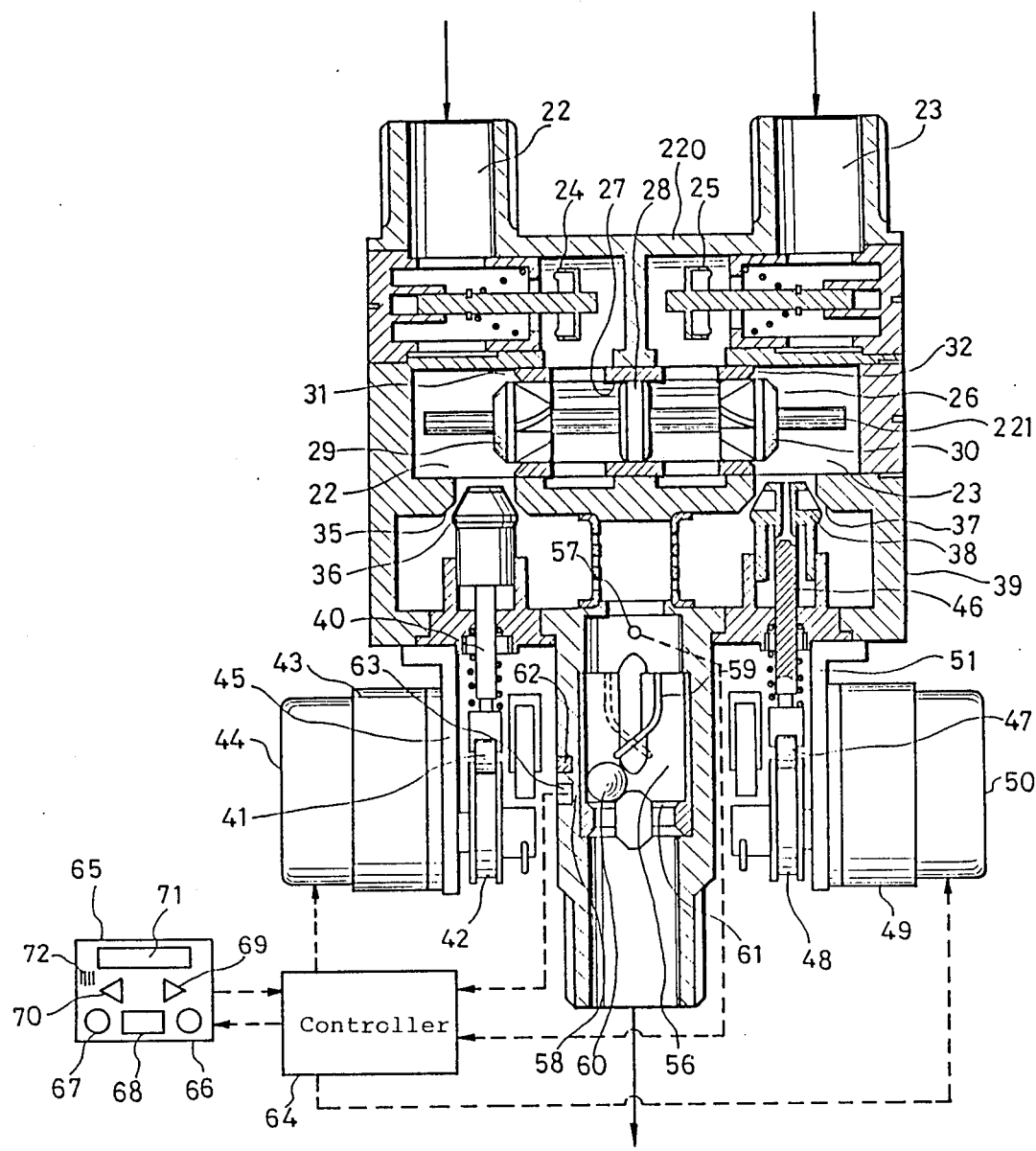
FIG. 2 is a partially sectional view of a first embodiment of a mixing valve apparatus in accordance with the present invention.

A first embodiment of a mixing valve apparatus according to the present invention is shown by a cross-sectional view in FIG. 2. A hot-water inlet 22 and a cold-water inlet 23 are disposed on an upper part of a mainifold 220. The hot-water inlet 22 is in fluid communication with a valve housiing for a hot-water check stop 24, and similarly the cold-water inlet 23 is in fluid communication with a valve housing for a cold-water check stop 25. Hot and cold water flow into a pressure balancing valve 26 through the respective check stops 24 and 25. The pressure balancing valve 26 comprises a cylinder 27 which has several round apertures therearound, a piston 28 disposed at a center of a spool 221 which is positioned in a center part of the cylinder 27, a valve member 29 for hot-water pressure control and a valve member 30 for cold-water pressure control disposed at near end parts of the spool 221.

Figure 3:
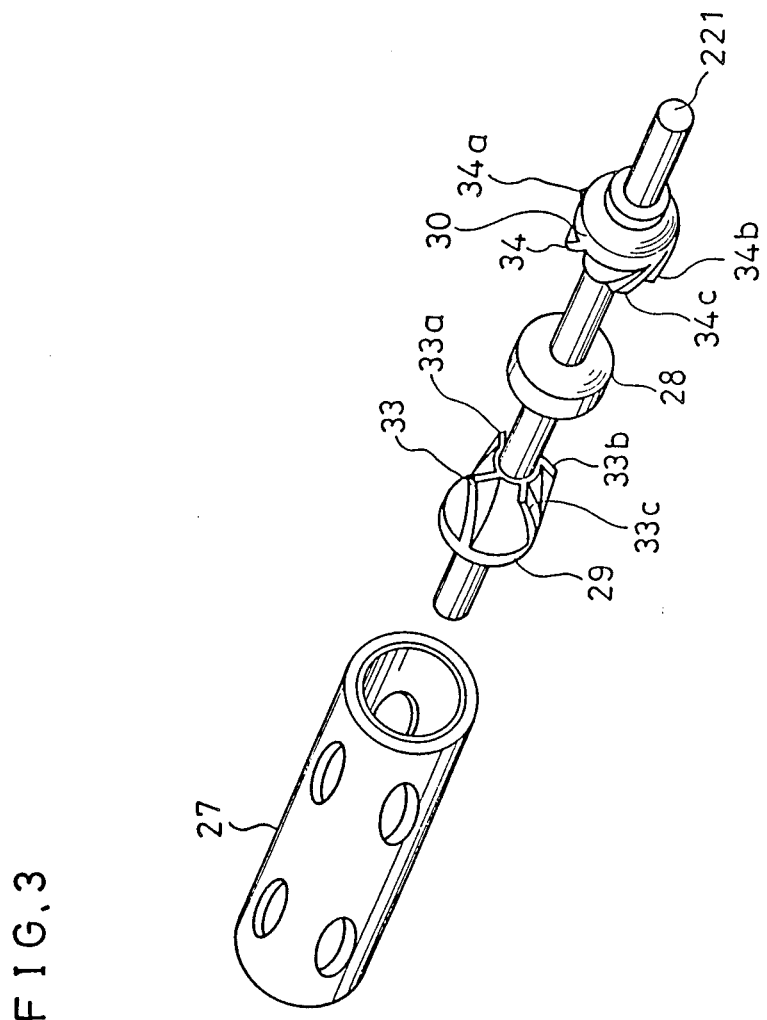
FIG. 3 is an exploded perspective assembly view of a pressure balancing valve of the first embodiment.

Constitutions of the cylinder 27 and the spool 221 are shown in detail in FIG. 3. The valve member 29 for hot-water pressure control has fins 33, 33a, 33b, 33c, and the valve member 30 for cold water has fins 34, 34a, 34b, 34c. An outer diameter of these fins are made slightly smaller than an inner diameter of the cylinder 27. The fins 33, 33a, 33b and 33c and the fins 34, 34a, 34b and 34c are twisted as shown in FIG. 3. The directions of twist of the fins 33, 33a, 33b, 33c and the fins 34, 34a, 34b, 34c are plane symmetrical to a plane which includes the piston 28 and is perpendicular to an axis of the spool 221. Since suitable annular gaps are formed between end parts 31, 32 of the cylinder 27 and peripheries of the respective valve members 29, 30, hot and cold water which flows into the pressure balancing valve 26 gives a pressure to the piston 8 and discharge through both annular gaps. When hot and cold water discharge through the annular gaps, water flows give torque to the fins 33–33c and 34–34c. As a result, the piston is made to rotate in a direction which is determined by a direction of twist of the fins. The piston 28 is shifted by a pressure difference between the hot and cold water, and the pressures in the hot-water inlet 22 and the cold-water inlet 23 are equalized. Hot water from the annular gap at the valve member 29 discharges into flow control part 39 which is formed by a valve seat 35 and a valve member 36. Similarly, cold water from the annular gap at the valve member 30 discharges into a flow control part 39 which is formed by a valve seat 37 and a valve member 38. The valve member 36 is driven in a vertical direction by a first electrical driving means 45 which comprises a rod 40, a roller 41, an eccentric cam 42, a reduction gear 43 and a motor 44. Similarly, the valve member 38 is driven in a vertical direction by a second electrical driving means 51 which comprises a rod 46, a roller 47, an eccentric cam 48, a reduction gear 49 and a motor 50. A temperature sensor 57 for sensing a temperature of mixed water and a flow rate sensor 58 are disposed in a water outlet 56. The flow rate sensor 58 consists of blades 59, a ball 60 which is made of ferro-magnetic material and rolls circularly on a ball holder 61 in the flow of mixed water, the ball holder 61 for holding the ball 60 in the water outlet 56, a magnet 62 and a magnetic resistance device 63. When water passes through the water outlet 56, the water is swirled by the blade 59, and the ball 60 rotates circumference of the blade 59. When the ball 60 passes near the magnetic resistance device 63, an output signal is issued. Therefore, the frequency of the output signal is in proportion to the flow rate of water.

Figure 4:
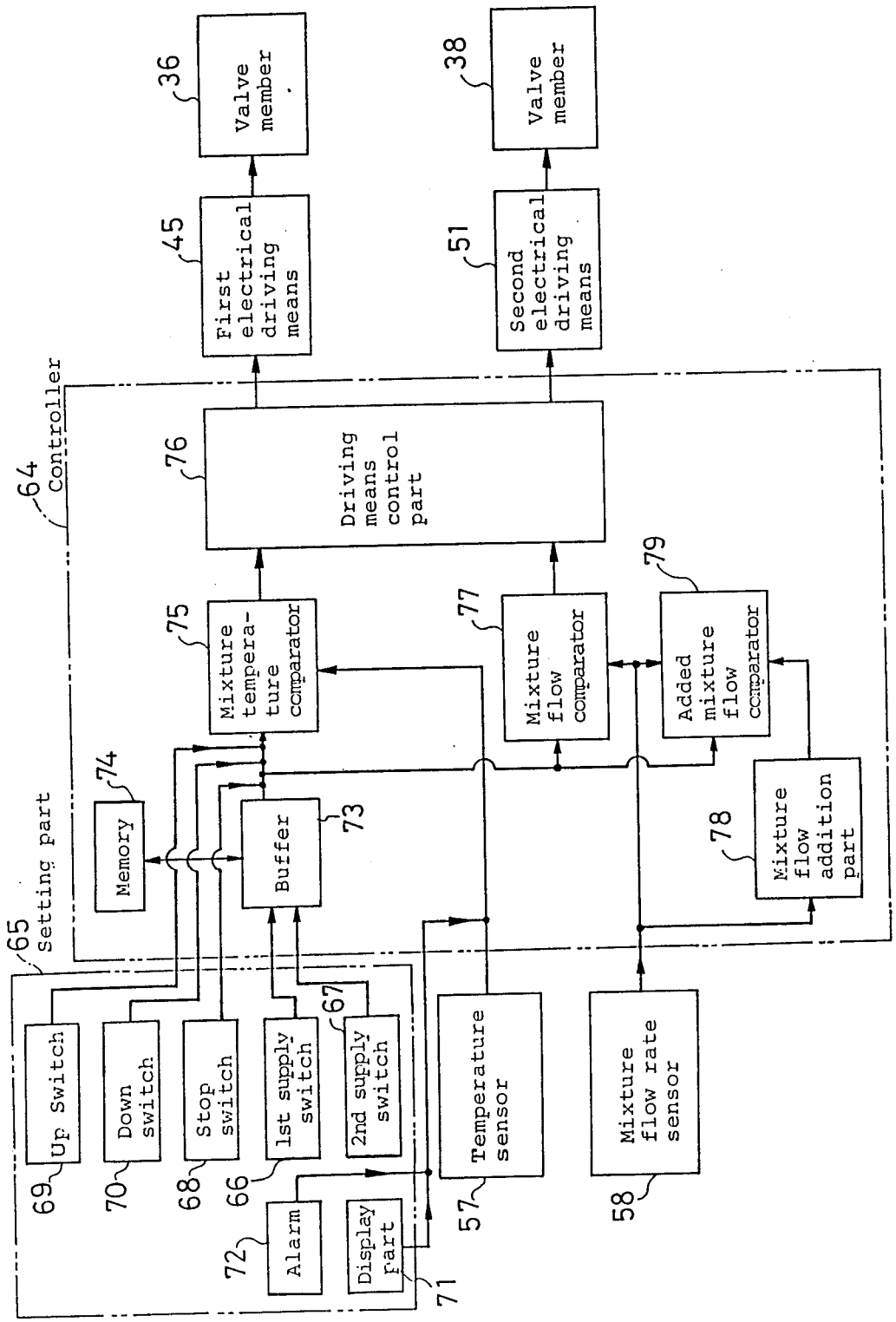
FIG. 4 is a block diagram of a control circuit for the first embodiment.

Output signals from the temperature sensor 57 and the flow rate sensor 58 are applied to a controller 64 as shown in FIG. 4. A setting part 65 comprises a first supply switch 66 for discharging mixed water wherein the temperature and the flow rate of mixed water are set, and a second supply switch 67 for discharging mixed water wherein the temperature, the flow rate and a whole volume of flow of mixed water are set, a stop switch 68 for stopping discharge of mixed water, an up-switch 69 for raising the temperature of mixed water, a down switch 70 for dropping the temperature of mixed water, and a display part 71 for displaying temperature and volume of discharge of mixed water and an alarm 72. A block diagram of the controller 64 is also shown in FIG. 4. A memory 74 memorizes preset data of temperature and a flow of the mixed water. The preset data are read out and are set to a buffer 73 of the controller 64 by an operation of the first supply switch 66 or the second supply switch 67. The signal of the temperature sensor 57 is compared with the preset data in a mixture temperature comparator 75, and a mixture temperature control signal is issued to a driving means control part 76. A signal of the mixture flow sensor 58 is compared with the preset data in a mixture flow comparator 77, and a mixture flow control signal is issued therefrom. Furthermore, a signal from the mixture flow sensor 58 is added in a mixture flow addition part 78. Signals added from the mixture flow addition part 78 is compared with the preset data in an added mixture flow comparator 79. A valve operation signal which is issued from the added mixture flow comparator 79 is applied to the driving means control part 76. The first electrical driving means 45 and second electrical driving means 51 are driven by the driving means control part 76.

Operation of this embodiment is as follows: in the initial state, the valve members 36 and 38 are pressed to the respective valve seats 35 and 37, and the flows of hot and cold water are checked. When the first supply switch 66 of the setting part 65 is operated, the data corresponding to a preset temperature and a flow rate of mixed water, for example 40° C., 12 l/min, are read out from the memory 74, and is set to the buffer 73. The data in the buffer 73 are applied to the mixture temperature comparator 75, the mixture flow comparator 77 and the added mixture flow comparator 79. In the first place, the motor 44 of the first electric driving means 45 and the motor 50 of the second electric driving means 51 are driven by the driving means control part 76. The eccentric cams 42 and 48 are rotated by the respective motors 44 and 50 through the respective reduction gears 43, 49. The rollers 41 and 47 which are disposed at lower parts of the respective rods 43 and 46 and are pressed to cam face of the respective eccentric cams 42 and 48. When the eccentric cams rotate, the valve member 36 and 38 which are disposed at upper parts of the respective rods 40 and 46 are moved downward. As a result hot and cold water flow through the respective annular gaps between the valve members 35, 38 and the valve seats 35, 37. After a predetermined period, the valve members 36 and 38 are moved in order to change a ratio of the flows of hot and cold water in the water outlet 56 by the first electric driving means 45 and the second electric driving means 51, respectively, under control of the driving means control part 76. The temperature of the mixed water in the water outlet 56 is equalized with the temperature which is set in the setting part 65.

In the above-mentioned control process, if temperature of the mixture of the hot water and the cold water is higher than the set temperature, the valve member 36 moves upward and the valve member 38 moves downward. On the contrary, if temperature of the water mixture is lower than the set temperature, the valve member 36 moves downward and the valve member 38 moves upward. The above-mentioned process is repeated alternately, and when the water mixture temperature reached within a predetermined range of the set temperature, the movement of the first electric driving means 44 and the second electric driving means 51 stop, the valve members 36 and 38 maintain their position.

If a pressure of cold water rises rapidly, the pressure balancing valve 26 is moved to the left by a difference of pressures at both sides of the piston 28. As a result, the annular gap between the valve member 29 and the end part 31 becomes wider and the annular gap between the valve member 30 and the end part 32 becomes more narrow. The piston 28 keeps a balanced state at the position that the pressures of both sides of the piston 28 are equalized. This action is made in a short time. Since the piston 28 is rotated by the flow of hot and cold water as mentioned above, compounds of calcium or the like dissolved in water has no chance to adhere to the surfaces of the valve members 29, 30, the piston 28 and the end parts 31, 32. Furthermore, since the appertures of the cylinder 27 are disposed around thereof, hot and cold water flow into the cylinder 27 from surrounding, and the piston 28 does not accept a force which is pressed to the inner wall of the cylinder 27 by gravity. Unbalance of the pressures of inlet hot and cold water is compensated by the above-mentioned process, and the change of the mixture temperature is controlled in a range of about ±1° C. at the mixture temperature of 40° C. The deviation from the set temperature of mixed water is detected by the temperature sensor 57, and the mixing ratio of hot and cold water is controlled by the valve members 36, 38, and the deviation from the set temperature can be decreased in a range of ±0.2° C. at 40° C. of the mixture temperature. When the temperature of hot water from the oil boiler, for example, changes cyclically, the valve member 36 and 38 are controlled alternately, and the temperature of mixed water is controlled to be in a range of the above-mentioned value. Furthermore, the flow rate of mixed water is kept in a predetermined value.

When the stop switch 68 of the setting part 65 is operated in order to stop the discharge of mixed water, the valve member 36 and 38 are driven to upward by the first electric driving means 45 and the second electric driving means 51, respectively, and the flows of hot and cold water are interrupted.

In case that the second supply switch 67 of the setting part 65 is pushed, the temperature and the flow of mixed water and the total volume of flows discharged mixed water are controlled. In order to fill a bath tub with hot water, a predetermined volume of discharging mixed water, for example 180 l, is set in the setting part 65. When the sum of discharging mixed water reaches to the predetermined value, the valve members 36 and 38 are driven to close by the first electric driving means 45 and the second electric driving means 51. In order to change the set temperature, the up-switch 69 or the down-switch of the setting part 65 is operated. The temperature and the flow of mixed water are displayed on the display part 71 in accordance with the signal of the temperature sensor 57 and the mixture flow sensor 58. Furthermore when the up-switch 69 is operated, the alarm 72 sounds alarm to inform the discharge of dangerous hot water.

In case that the mixing valve apparatus is not used for a long period, for example several weeks, the valve members 36 and 38 are opened at regular intervals by control of the controller 64 to prevent adhesion between the valve member 36 and the valve seat 35 and between the valve member 38 and the valve seat 37.

In this embodiment, the valve members 36 and 38 are driven by two independent electric driving means 45 and 51, and the temperature and the flow of mixed water are controlled by the same valve means. Therefore, the constitution is very simple.

Figure 5:
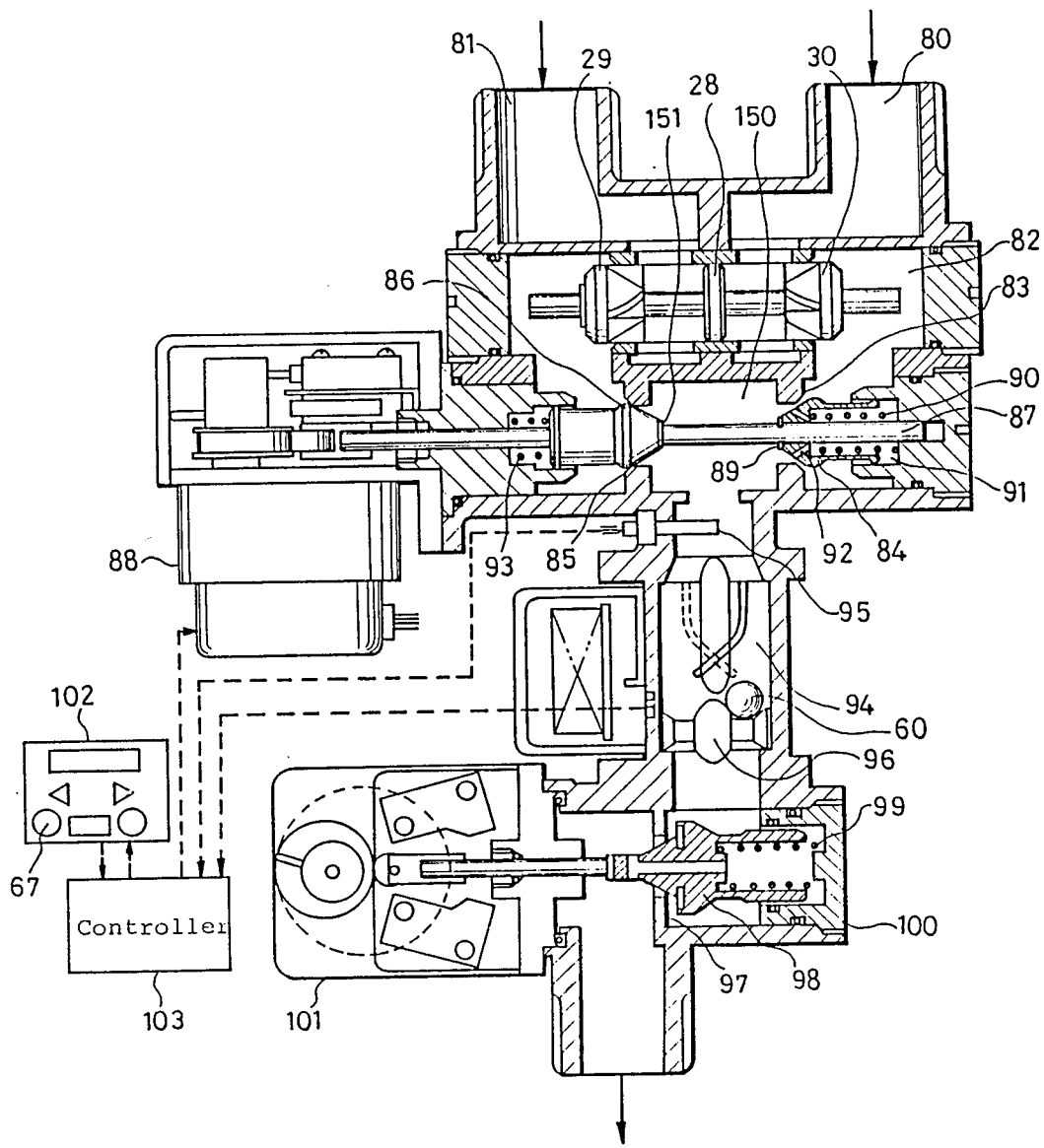
FIG. 5 is a cross-sectional view of a second embodiment of the mixing valve apparatus in accordance with the present invention.

A second embodiment in the present invention is shown in FIG. 5. In this embodiment, hot- and cold-water check stops are not provided in the water paths between hot- and cold-water inlets 80 and 81 and a pressure balancing valve 82. Difference of pressures of hot and cold water which flow into the respective hot- and cold-water inlets 80 and 81 is adjusted by the pressure balancing valve 82 in a similar manner as shown in the first embodiment. Hot water from the pressure balancing valve 82 flows through an annular gap between a valve seat 83 and a valve member 84, and cold water from the pressure balancing valve 82 flows through an annular gap between a valve seat 85 and a valve member 86. Hot and cold water which are discharged from the respective annular gaps are mixed in a mixing conduit 150. The valve members 84 and 86 are driven through a rod 87 by an electric driving means 88 which have a similar constitution as shown in FIG. 2. Movement of the valve member 84 is limited by a stopper 89 which is made on the rod 87, and the valve member 84 is pressed to the stopper 89 by a spring 90. Holes 92 which is open into the mixing conduit 150 are disposed on a conical part of the valve member 84, and these holes communicate between the mixing conduit 150 and a back pressure part 91 which is made in the valve member 84. Similarly, the valve member 86 have the same structure to that of the valve member 84, however a spring 93 is selected weaker than the spring 90, and the rod 87 is normally pushed leftward by the stronger spring 90. A distance between the stopper 83 and 151 is designed such that when the valve member 86 touches the valve seat 85, a suitable annular gap is kept between the valve member 84 and the valve seat 83 as shown in FIG. 5. Therefore, the valve member 84 and 86 move to the same direction by shift of the rod 87, and when the annular gap between the valve member 86 and the valve seat 85 becomes wider, the annular gap between the valve member 84 and the valve seat 83 becomes narrow, on the contrary. Thus the mixing ratio of hot and cold water is controlled.

The mixed water flows into a mixed water conduit 94. A temperature sensor 95 and a flow rate sensor 96 are disposed in the mixed water conduit 94. Additionally, a flow control valve 100 is disposed at an under part of the mixed water conduit 94. The flow control valve 100 consists of a flow control valve member 98, a valve seat 97 and a spring 99, and is driven by an electric driving means 101 for the flow control valve 100. Furthermore a setting part 102 for setting a temperature, a flow of mixed water and total volume of discharging mixed water has the same constitution of the first embodiment. A controller 103 which controles the electric driving means 88 and 101 has also the same constitutiion of the first embodiment. As mentioned above, in this embodiment, the control of the mixing ratio of hot and cold water is performed by the valve members 84, 86, and the control of the flow of mixed water is performed by the flow control valve 100. The electric driving means 88 and 101 drive the valve member 84, 86 and the flow rate control valve 100, respectively. Therefore, adjustments of the mixing ratio and a change of the flow of hot and cold water can be operated simultanously, and a response characteristic of the adjustments of a temperature and a flow rate are improved in comparison with the first embodiment.

A third embodiment of the present invention is shown in FIG. 6(a), FIG. 6(b) and FIG. 6(c). This embodiment is a practical model of the mixing valve apparatus in accordance with the present invention. The mechanical constitution is similar to the first embodiment. As shown in FIG. 6(b), hot-water conduit 105 and cold-water conduit 106 are formed in a valve body 104. The hot-water conduit 105 is in communication with a hot-water inlet 109 through a connection conduit 110, and the cold-water conduit 106 is communication with a cold-water inlet 107 through a connection conduit 108. The hot- and cold-water inlets 107, 109 are connected to the respective hot- and cold-water lines. The pressures of hot and cold water are equalized by a pressure balancing valve 111 which is similar to the pressure balancing valve 82 of the first embodiment. Hot and cold water from the pressure balancing valve 111 flow into a mixing and flow control part 160.

Figure 7:
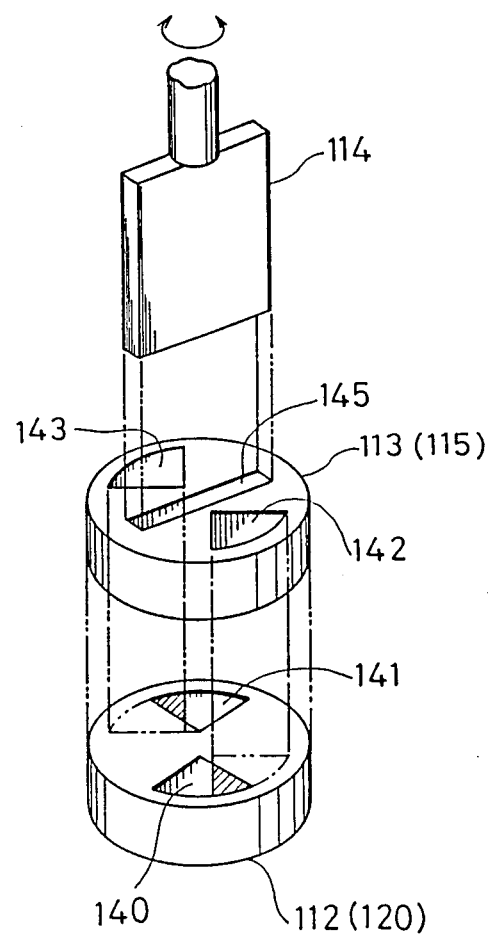
FIG. 7 is an exploded perspective assembly view of a valve member and a valve seat in the third embodiment.

The constitution of the flow control part 160 in this embodiment is different from the first embodiment, and the detailed constitution thereof is shown in FIG. 7.

A disc-shaped valve seat 112 has two fan-shaped apertures 140, 141, and a disc-shaped valve member 113 has also two fan-shaped apertures 142, 143. A rectangular hole 145 is formed on a surface of the valve member 113. A driving member 114 of an electric driving means 134 is inserted in the rectangular hole 145 and rotates the valve member 113. The valve member 113 is piled on the valve seat 112 and is pressed to them in coaxial manner. In FIG. 7, the valve member 113 is drafted apart from the valve seat 112 in order to show the respective apertures thereof. The valve seat 112 is fixed on the mixing valve body.

When the valve member 113 is rotated by the driving member 114 of the electric driving means 134, overlapped areas of the apertures 140 and 142, hence of the apertures 141 and 143 change, and the flow of water is controlled.

A setting part 123 and a controller 124 are disposed on an upper outside surface of a housing 122. The housing 122 is made as an airtight housing. The electric devices of the setting part 123 and a controller 124 are enclosed in the casing 122, and are protected from water or wet air. The valve member 113 is driven by first electric driving means and the valve member 115 is driven by a second electric driving means 116. Mixed water flow into a mixture conduit 117. A mixture flow rate sensor 118 and temperature sensor 119 are disposed in the mixture conduit 117. The first electric driving means 134 and the second electric driving means 116 are covered by the housing 122. Mixed water which is adjusted to a desired temperature and a flow rate is discharged from a mixture water conduit 125 and is supplied to a bath tub or the like.

In this embodiment, since the setting part 123 and the controller 124 are contained compact in the housing 122 of the mixing valve apparatus, the wires for connecting the electric devices are short, hence the controller 124 is not influenced by electrical noises; furthermore, installment of the mixing valve apparatus is convenient.

What is claimed is:

1. A mixing valve apparatus for mixing hot and cold water supplied from hot and cold water lines, comprising:
    pressure balancing valve means, comprising a cylinder formed with a plurality of apertures therein, spool means having a piston mounted on a center portion thereof for isolating a hot water passageway and a cold water passageway from each other, and two valve members having twisted fins thereon which are displaced by water flow, for equalizing respective pressures of hot and cold water, said two valve members being mounted to said spool means;
    first valve means for controlling an amount of flow of hot water from said pressure balancing valve means;
    second valve means for controlling an amount of flow of cold water from said pressure balancing valve means;
    first motorized drifting means for moving said first valve means;
    second motorized driving means for moving said second valve means;

mixing conduit means for mixing hot and cold water supplied from said first valve means and said second valve means;

temperature sensor means for detecting a temperature of mixed water mixed in said mixing conduit means;

setting means for setting a desired temperature of said mixed water; and control means for controlling said first and said second motorized driving means in accordance with said temperature detected by said temperature detected by said sensor means and said desired temperature set by said setting means.

2. A mixing valve apparatus in accordance with claim 1, further comprising a rod on which said first valve means and second valve means are disposed, said first and second valve means being moved by one single motorized driving means.

3. A mixing valve apparatus in accordance with claim 1, wherein
said control means and said electric driving means are contained in a housing and said setting part is disposed on a surface of said housing.

4. A mixing valve apparatus coupled to sources of hot and cold water, comprising:

pressure balancing valve means comprising a cylinder formed with a plurality of apertures therein, spool means having a piston mounted on a center portion thereof for isolating a hot water passageway and a cold water passageway from each other, and two valve members having twisted fins thereon which are rotated by water flow, for equalizing respective pressures of hot and cold water, said two valve members being mounted to said spool means;

first valve means for controlling a flow of hot water from said pressure balancing valve means;

second valve means for controlling a flow of cold water from said pressure balancing valve means;

first electric driving means for shifting a position of said first valve means;

second electric driving means for shifting a position of said second valve means;

mixing conduit means for mixing hot and cold water from said first valve means;

temperature sensor means for detecting a temperature of mixed water;

flow rate sensor means for detecting an amount of flow of mixed water mixed by said conduit means;

setting means for setting data including a desired temperature, a desired amount of flow of mixed water, and a sum of a hot- and cold-water discharge water mixture; and control means for driving said first electric driving means and second electric driving means in accordance with a temperature detected by said temperature sensor means and with data set by said setting means.

5. A mixing valve apparatus in accordance with claim 4, wherein
said control means and said electric driving means are contained in a housing and said setting part is disposed on a surface of said housing.

6. A valve apparatus for mixing hot and cold water, comprising:

pressure balancing valve means comprising a cylinder formed with a plurality of apertures therein, spool means having a piston mounted on a center portion thereof for isolating a hot water passageway and a cold water passageway from each other, and two valve members having twisted fins thereon which are rotated by water flow therepast for equalizing pressures of hot and cold water, respectively, said two valve members being mounted to said spool means;

first valve means for controlling a flow of hot water, comprising a valve seat with at least one aperture and a valve member with an aperture;

second valve means for controlling a flow of cold water comprising a valve seat with at least one aperture and a valve member with at least one aperture, arranged coaxial with one another;

first electric driving means for moving said first valve means;

mixing conduit means for mixing hot and cold water from said first valve means and said second valve means, respectively to produce mixed water;

second electric driving means for moving said second valve means;

temperature sensor means for detecting a temperature of said mixed water;

flow rate sensor means for detecting a flow rate of said discharge water mixture;

setting means for setting data including a desired temperature, desired flow, and a sum of discharge water mixture; and control means for driving said first electric driving means and second electric driving means in accordance with a temperature and flow detected by said temperature sensor means and said flow rate sensor means, respectively, and said data set by said setting means.

7. A mixing valve apparatus in accordance with claim 6, wherein
said control means and said electric driving means are contained in a housing and said setting part is disposed on a surface of said housing.

* * * * *